United States Patent [19]

Duy et al.

[11] 3,884,779

[45] May 20, 1975

[54] METHOD FOR THE CONTROLLED FORMATION OF THE LAYER OF COPPER SULPHIDE OF A CADMIUM SULPHIDE PHOTOCELL

[75] Inventors: Thuoc Nguyen Duy, Ivry; Wolfgang Palz, Paris, both of France

[73] Assignee: Societe Anonyme de Telecommunications, Paris, France

[22] Filed: May 24, 1973

[21] Appl. No.: 363,424

[52] U.S. Cl. .................................................... 204/92

[51] Int. Cl. ............................................ C01b 17/00

[58] Field of Search ................................. 204/92, 86

[56] References Cited

UNITED STATES PATENTS

| | | | |
|---|---|---|---|
| 602,872 | 4/1898 | Richards et al. | 204/92 |
| 602,873 | 4/1898 | Richards et al. | 204/92 |
| 1,261,023 | 4/1918 | Griffith | 204/92 |
| 3,051,636 | 8/1962 | Kaspaul | 204/92 |

FOREIGN PATENTS OR APPLICATIONS

| | | |
|---|---|---|
| 1,562,163 | 2/1968 | France |

OTHER PUBLICATIONS

Bassett et al., Principles of Chemistry, 1966, pages 330–334, Prentice-Hall, Inc.

*Primary Examiner*—John H. Mack
*Assistant Examiner*—Wayne A. Langel

[57] ABSTRACT

A method for the controlled formation of the layer of copper sulphide of a cadmium sulphide photocell by immersion in a solution of cuprous ions, wherein the photocell being produced is maintained throughout the duration of its immersion in said solution at a constant potential at least equal to that of a pure copper electrode immersed in the same solution.

4 Claims, 3 Drawing Figures

METHOD FOR THE CONTROLLED FORMATION OF THE LAYER OF COPPER SULPHIDE OF A CADMIUM SULPHIDE PHOTOCELL

The present invention relates to an improvement in the manufacture of cadmium sulphide (CdS) solar cells including a layer of copper sulphide ($Cu_2S$).

Such cells have already been manufactured in particular by the Electronic Research Division of the Clevite Corporation which published on this subject on Dec. 30, 1966 a report entitled "Study of thin film large area photo-voltaic solar energy converter," written by F. A. Shirland, J. R. Hietanen and W. K. Dower and prepared for the National Aeronautics and Space Administration.

French Pat. No. 1,562,163 describes specific technological methods employed for obtaining in the best manner the junctions between the interfaces of the different chemical media of the various layers constituting the photocell: a layer of silver which is the first electrode of the photocell, a layer of zinc which reduces the contact resistance between the silver electrode and the layer of CdS, the layers of CdS and $Cu_2S$ which are the active layers of the photocell; a second electrode which is in the form of a grid which squares the sensitive surface of the photocell, and a protective layer which protects the sensitive surface of the photocell from attack by exterior agents.

The present invention relates to a method for forming the $Cu_2S$ layer and it is applicable to all types of manufacture of such photocells whenever the layer of $Cu_2S$ is obtained through ion exchange by immersion by the transformation of the surface layer of CdS by dipping the future cell in a solution of cuprous ions.

Thus, by employing the method for example disclosed in the aforementioned French Pat. No. 1,562,163, in which the layer of $Cu_2S$ is obtained by dipping the cell in the course of preparation, at 90°C, for three seconds, in a solution containing 80 g of Cu Cl per litre of water, a considerable coppering of the surface of $Cu_2S$ has been observed. This coppering is harmful since it reduces the energy efficiency of the cell.

The method according to the invention permits forming the layer of $Cu_2S$ without resulting in the coppering of the surface of said layer.

This is achieved, in accordance with the invention, by forming the layer of $Cu_2S$ by controlling the potential of the photocell in process of formation during the immersion thereof in a solution of cuprous ions. This potential is advantageously controlled with respect to a potential of a pure copper electrode immersed in the same solution as the photocell in course of preparation.

Further, according to the invention the solution of cuprous ions comprises 25 g of CuI and 500 g of KI diluted in a litre of water to which is added a small amount of hydrazine monobromide as a reducing agent.

The method according to the invention is carried out rapidly and easily and will be understood from the ensuing description with reference to the accompanying drawing in which.

Figure 1:
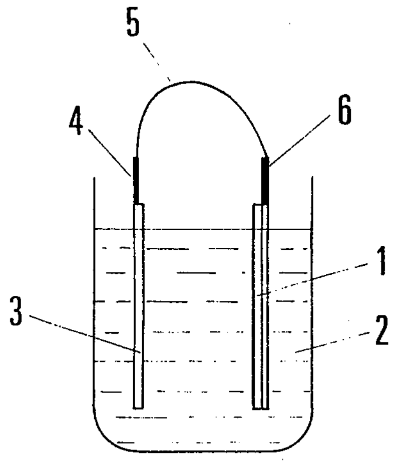
FIG. 1 is a diagram of a device for carrying out the method according to the invention.

In FIG. 1, the photocell 1 being produced is immersed in a solution of cuprous ions 2. In this solution 2 there is also immersed a pure copper electrode 3 and, according to the invention, the connection 4 of this electrode 3 is directly connected through a wire 5, termed a short-circuit wire, to the connection 6 of the photocell 1. The potential of the photocell is then made to remain, throughout the duration of the immersion, equal to that of the pure copper electrode.

Figure 3:
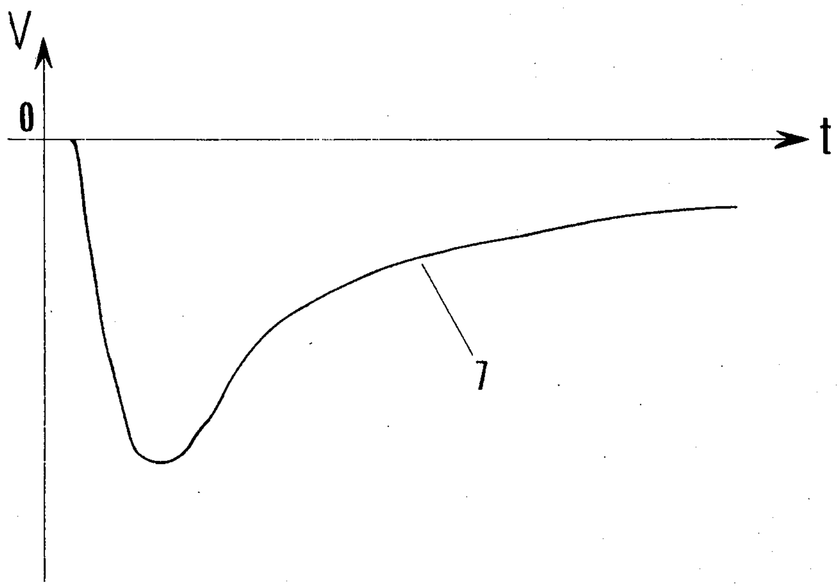
FIG. 3 shows a curve representing variations in the potentials recorded between the photocell, whose potential is not fixed, and a pure copper electrode both of which are immersed in a solution of cuprous ions.

In the absence of this connection afforded by the wire 5, the potential of the photocell 1 varies with respect to time according to the curve 7 shown in FIG. 3, the potential of reference 0 being the potential of a pure copper electrode immersed in the same bath. It will be observed from the curve 7 that the potential of the photocell is negative with respect to the zero potential of the pure copper electrode.

Figure 2:
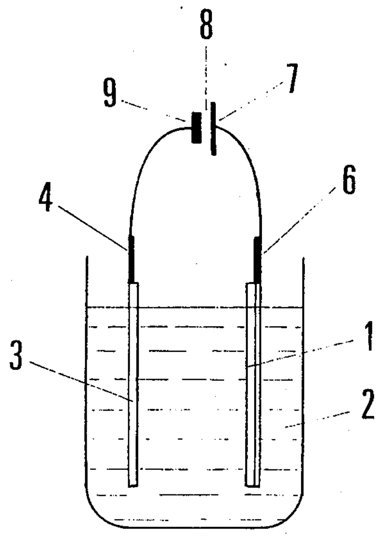
FIG. 2 is similar to FIG. 1 and shows a modification of the method according to the invention.

According to the invention, the potential of the photocell with respect to the potential of the pure copper electrode is made to remain constant throughout the duration of immersion and made equal to a value which is either zero or positive. The device shown in FIG. 1 corresponds to the case of a voltage maintained zero and the device shown in FIG. 2 corresponds to the case of a voltage maintained positive. In FIG. 2 the elements corresponding to those shown in FIG. 1 carry the same reference numerals. The connection 6 of the photocell is connected to the positive terminal 7 of a voltage battery 8 whose negative terminal 9 is connected to the connection 4 of the pure copper electrode 3. The voltage battery 8 can, of course, be substituted by any conventional direct current power source.

What we claim is:

1. A method for the controlled formation of the layer of $Cu_2S$ of a CdS—$Cu_2S$ photocell through ion exchange by immersion in a solution of cuprous ions, the photocell being produced being maintained throughout the duration of its immersion in said solution at a constant positive or zero potential with respect to metallic copper immersed in the same solution.

2. A method as claimed in claim 1, wherein the solution of cuprous ions comprises 25 g of CuI and 500 g of KI dissolved in a litre of water to which is added a small amount of hydrazine monobromide as reducing agent.

3. A method as claimed in claim 1, wherein the photocell being produced is short-circuited with a piece of copper immersed in said solution.

4. A method as claimed in claim 1, wherein the photocell being produced is connected to the positive terminal of a direct current power source, the negative terminal of which is connected to a piece of copper immersed in said solution.

* * * * *

UNITED STATES PATENT OFFICE

CERTIFICATE OF CORRECTION

Patent No. 3,884,779 Dated May 20, 1975

Inventor(s) THUOC NGUYEN DUY et al

It is certified that error appears in the above-identified patent and that said Letters Patent are hereby corrected as shown below:

In the heading, insert -- Claims priority from French Patent Application 72 20214, filed in France on June 6, 1972 --

Signed and Sealed this

*ninth* Day of *September 1975*

[SEAL]

*Attest:*

RUTH C. MASON
*Attesting Officer*

C. MARSHALL DANN
*Commissioner of Patents and Trademarks*